United States Patent [19]

Tokuno

[11] 4,163,185

[45] Jul. 31, 1979

[54] OBJECT LOCATING APPARATUS

[75] Inventor: Masateru Tokuno, Nishinomiya, Japan

[73] Assignee: Rengo Co., Ltd., Osaka, Japan

[21] Appl. No.: 712,045

[22] Filed: Aug. 6, 1976

[30] Foreign Application Priority Data

Mar. 4, 1976 [JP] Japan ................................. 51-24489

[51] Int. Cl.[2] ............................................ G05B 19/28

[52] U.S. Cl. .................................. 318/601; 318/603; 318/640

[58] Field of Search ...................... 318/601, 603, 640; 219/121 L, 121 LM; 356/172; 250/561; 83/498, 499, 520

[56] References Cited

U.S. PATENT DOCUMENTS

| | | | |
|---|---|---|---|
| 3,549,733 | 12/1970 | Caddell | 219/121 LM |
| 3,581,181 | 5/1971 | Wallace | 318/640 |
| 3,646,418 | 2/1972 | Sterns et al. | 318/603 |
| 3,651,392 | 3/1972 | Frisch et al. | 318/603 |
| 3,708,657 | 1/1973 | Kelling | 318/603 |
| 3,728,607 | 4/1973 | Isak | 318/603 |

*Primary Examiner*—Gene Z. Rubinson
*Assistant Examiner*—Eugene S. Indyk
*Attorney, Agent, or Firm*—Birch, Stewart, Kolasch & Birch

[57] ABSTRACT

This invention relates to an object locating apparatus which can be used for locations of various objects. The apparatus comprises a laser device capable of projecting a laser beam which serves as a mark of a predetermined position of an object to be located, a mechanism for holding and moving said laser device, means for driving said mechanism so as to move said laser device, and means for numerically controlling the drive means so as to stop said laser device at a predetermined position.

5 Claims, 3 Drawing Figures

OBJECT LOCATING APPARATUS

BACKGROUND OF THE INVENTION

This invention relates to an apparatus for locating an object and more particularly to an apparatus which is able to determine a predetermined position of an object in a difficult remote position and is also able to project a laser beam onto the predetermined position.

Referring to an operation of locating, for instance, locating the blades of a slitter-scorer for longitudinally slitting and scoring a web of corrugated board, sheet-zinc or cloth in predetermined positions, heretofore, the work of determining the positions of slitting blades and scoring blades of the slitter or the slitting-scorer in conformity with a predetermined slitting width and a predetermined scoring position has been done in such a way that a worker measures the position by a scale each time. In small restricted places the work has been extremely difficult and also dangerous.

The situation discussed above would be overcome by providing a locating apparatus with which a mark indicative of a predetermined blade position can be remotely obtained without hindering the action of the worker and thus the worker requires only to set the blade in conformity with the mark.

SUMMARY OF THE INVENTION

It is an object of the present invention to provide an object locating apparatus which is convenient for locating a blade location as described above and which can also be used for locating a variety of various objects said apparatus being characterized by comprising a laser device capable of projecting laser beam which serves as a mark of a predetermined position of an object to be located, a means for moving and holding said laser device, means for driving said means so as to move said laser device, and means for numerically controlling the drive means so as to stop said laser device at a predetermined position.

Another object of the present invention is to provide the aforementioned object locating apparatus characterized in that said means for moving said laser device while holding it comprising a holder for said laser device, a threaded rod which is rotatably supported on a pair of stanchions with which said holder is threadably engaged, and guide rods which are arranged in parallel with said threaded rod, which are supported by said stanchions and on which said holder is slidably mounted, and a driving means which drives said threaded rod.

Still another object of the present invention is to provide the aforementioned object locating apparatus characterized in that the numerical control means comprises a pulse generator which is operated by the rotation of said threaded rod, a position setting portion which includes digital switches for setting the predetermined stop positions of said laser device, and a numerical control portion which controls said driving means so as to stop said laser device at said predetermined position by comparing a setting signal from said position setting portion and a feedback signal from said pulse generator.

BRIEF DESCRIPTION OF THE INVENTION

Other objects and further scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

The present invention will be readily apparent from the following description of a certain preferred embodiment thereof, taken in conjunction with the accompanying drawings which are given by way of illustration only, and thus are not limitative of the present invention, and wherein.

DETAILED DESCRIPTION OF THE INVENTION

Figure 3:
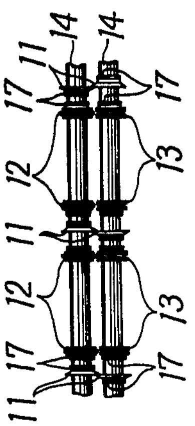
FIG. 3 is a view illustrating the slitting blades, the scoring blades and blade shafts of the slitter-scorer.
Figure 2:
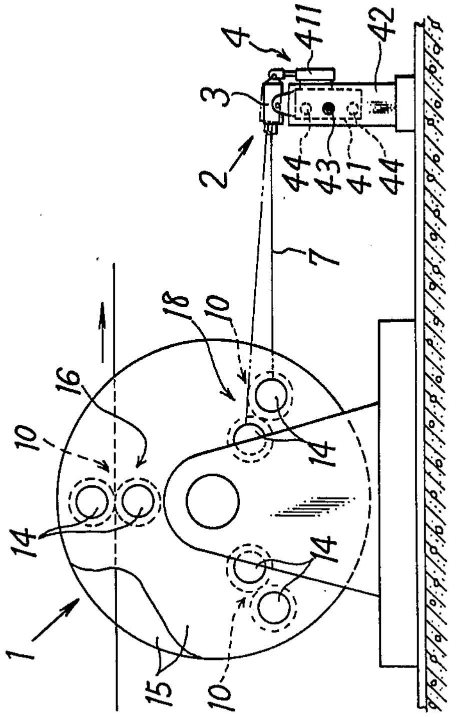
FIG. 2 is a side elevational view of the object locating apparatus when applied to the location of blades of a slitter-scorer, numerical control means and the threaded rod driving means being omitted from FIG. 2.

An embodiment of this invention will now be described with reference to an example where the present invention is used for locating the slitting blades and scoring blades of a slitter-scorer for splitting and scoring a web of corrugated board. The slitter-scorer 1 has three slitting and scoring stations 10. Each station 10 consists of a pair of blade shafts 14 which possess conventional slitting blades 11 and scoring blades 12, 13. The blade shafts are rotatably supported on a pair of turnable frames 15, and they can be rotated by driving means, not shown, so that the station 10 enters into a position 16 for slitting and scoring operation. The blades 11, 12 and 13 can selectively be moved along the blade shafts 14 or be fixed thereto in a known conventional manner. Further, a mark line 17 for registering the blade to a laser beam is provided at the periphery of the head part of each of the blades 11, 12 and 13. Locating apparatus 2 according to the present invention comprises a laser device 3, a means 4 for holding and moving the laser device 3, means 5 for driving the means 4, and means 6 for numerically controlling the driving means 5. The means 4 consists of a laser device holder 41, a threaded rod 43 arranged in parallel with the blade shafts 14, with both ends thereof rotatably supported by a pair of stanchions 42 and with which the holder 41 is threadably engaged. The means 4 further includes guide rods 44 arranged in parallel with the threaded rod 43, which are supported by the stanchions 42 and on which the holder 41 is slidably mounted. The threaded rod 43 is driven by the drive means 5. The means 5 consists of a brake-clutch unit 51 including an electromagnetic brake and an electromagnetic clutch and a motor 52 which is coupled to the threaded rod 43 through the unit 51. The unit 51 is of the type wherein when the brake is operated, the clutch is disengaged and wherein when the brake is released, the clutch is engaged. The laser device 3 is pivotally mounted on the holder 41 so that the laser beam 7 can be not only onto either of the paired blade shafts 14 situated at the blade locating position 18 but also in a direction orthogonal to the blade shafts 14. The switching of the laser beam projection from one of the paired blade shafts to the other is effected by tilting the laser device 3 by means of a piston and cylinder assembly 411 secured to the holder 41. The numerical control means 6 is composed of a pulse generator 61, a position setting portion 62 and a numerical control portion 63. The pulse generator 61 can be actuated in connection with the threaded rod 43. The pulse generator converts a movement distance of the laser device 3 into the number of pulses, and puts the latter into the numerical control portion 63 as a feedback signal F. The position setting portion 62 has digital switches DS1 to DS3 in at least the same number as that of the slitting blades on the blade shaft, and stop command switches PS1 to PS3 corresponding to the digital switches, and also has digital switches DC1 to DC4 in at least the same number as that of the scoring blades on the blade shaft, and stop command switches PC1 to PC4 corresponding to the digital switches DC1 to DC4. In addition, the position setting portion includes running command switch ST for starting the drive means 5. Further, it is equipped with a conventional scanning circuit for catching the digital switches being set. Each digital switch serves to set a predetermined stop position of the laser device 3. The position setting portion can set distance which the laser device 3 is to be moved from its reference position X to a position corresponding to the predetermined blade position.

In the present embodiment, this distance is identical to a distance from a reference position of the blade to the predetermined position thereof.

The numerical control portion 63 compares a setting signal S from the position setting portion 62 with the feedback signal F from the pulse generator 61, and dispatches control signals C1 and C2 to the brake-clutch unit 51 and the motor 52 so as to stop the laser device 3 at the predetermined position. The portion 63 consists of a conventional up-down counter for counting the pulses from the pulse generator 61, conventional comparator and adder circuits, conventional control sequence and motor control circuits, etc. In operation, first the laser device 3 is placed at the reference position X by the use of, for example, a limit switch not shown disposed at the reference position X. Thereafter, the digital switches corresponding to the respective blades are set in conformity with the intended positions of the blades, and the stop command switches corresponding to the respective digital switches are depressed. Further, the laser beam 7 from the laser device 3 is projected onto the blade shaft 14 lying at the blade locating position 18.

Figure 1:
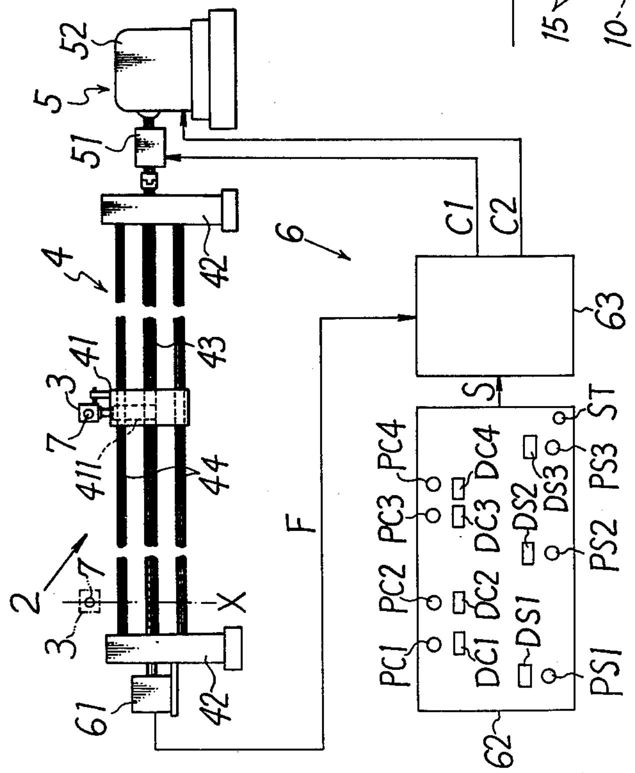
FIG. 1 is a diagrammatical illustration of an object locating apparatus.

Subsequently, when the running command switch S is depressed, the brake-clutch unit 51 is released and the clutch is engaged. Thus, the motor 52 is started, so that the threaded rod 43 begins to rotate and the laser device 3 moves rightwards in FIG. 1. When the laser device 3 reaches the predetermined position, the brake is operated and the clutch is disengaged automatically in response to the signal from the numerical control portion 63 provided that the stop command switch corresponding to the particular position is being depressed. In addition, the motor 52 stops, and the laser device 3 stops. Thereafter, the blade location is positioned in such a manner that the slitting blade 11 corresponding to the digital switch DS1 is moved along the blade shaft 14 and that the mark line 17 at the head portion of the blade is brought into coincidence with the laser beam 7.

Subsequently, the running command switch ST is depressed again, so as to move the laser device 3 to the next predetermined position and to locate the scoring blade 13 corresponding to the switch DC1. In this way, the positions of the respective blades can be successively determined.

In order to locate the blades on the other blade shaft, the digital switches are reset and thereafter the same operation as in the foregoing explanation is performed. In the above operation the threaded rod 43 and the laser device 3 may be stopped by brake-clutch unit 51 which serves to cut off the inertia force of the rotor of the motor 52 from the threaded rod 43 and to immediately stop the threaded rod.

In order to quickly move the laser device 3 to a predetermined position to economize time, it is preferrable to use a motor capable of switching from high to low speeds such as the motor 52 and to switch the rotation of the threaded rod 43 from the high speed to the low speed just before the predetermined stop position of the laser device 3.

As set forth above, according to this invention, there is the advantage that the predetermined position of an object can be speedily and reliably indicated by employing a laser beam of good light condensing degree at a position apart from the object to be located.

What is claimed is:

1. An apparatus for locating at a predetermined position along the length of a blade carrier the blades of a slitter-scorer for longitudinally slitting and scoring a web of material comprising:

- a laser device remotely positioned out of engagement with said blade carrier for projecting a laser beam onto an adjacent blade carrier to indicate a predetemined position on said blade carrier at which a blade of said slitter-scorer should be positioned;
- means for movably supporting said laser device along a line parallel to said blade carrier so that a plurality of predetermined positions may be indicated along said blade carrier at which a blade of said slitter-scorer should be positioned;
- means for driving said means for movably supporting said laser device so as to move the laser device along said line parallel to said blade carrier;
- said means for movably supporting said laser device includes means for tilting said laser device so as to project a laser beam onto an adjacent blade carrier which is not in the same plane as said means for movably supporting said laser device;
- command means for initiating movement of the laser device along said line parallel to said balde carrier;
- control means being programmed with a value representing the distance of said predetermined position along said blade carrier;
- means for generating a signal representing the distance from a reference point that the laser device has moved along said line parallel to said blade carrier; and
- means for comparing said signal with said value and generating a stop signal to said drive means to stop the laser device so that the laser beam is projected onto an adjacent blade carrier to indicate a predetermined position on said blade carrier at which a blade of said slitter-scorer should be positioned.

2. An apparatus as claimed in claim 1, wherein said means for movably supporting said laser device comprises a holder for the laser device, a threaded rod parallel to the carrier, which is rotatably supported and with which said holder is threadably engaged, at least one guide member parallel to said threaded rod on which said holder is slidably mounted, and wherein said drive means and said means for generating a signal representing the distance that the laser device moved are connected to said threaded rod.

3. An apparatus as claimed in claim 1, wherein said driving means comprises a brake-clutch unit and an electric motor which delivers its power through the brake-clutch unit.

4. An apparatus as claimed in claim 1, wherein said means for generating a signal representing the distance that the laser device moved is a pulse generator.

5. An apparatus as claimed in claim 1, wherein said control means includes a digital switch for setting the value representing said predetermined position.

* * * * *